Feb. 10, 1970    W. H. KLEINHENN    3,494,243
SEALING FASTENER
Filed June 28, 1967    2 Sheets-Sheet 1
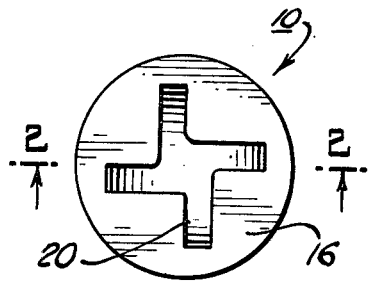
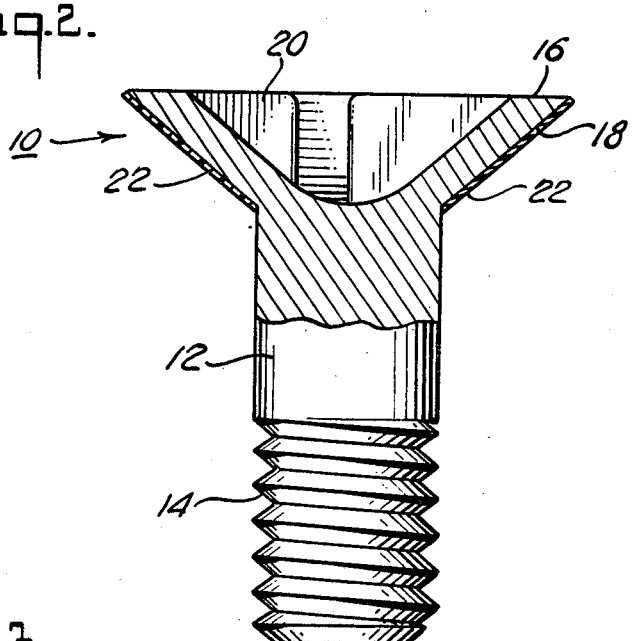
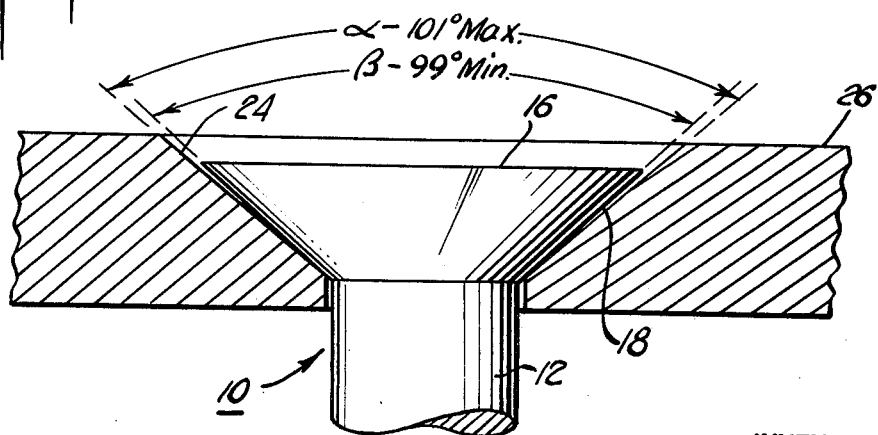
INVENTOR:
WALTER H. KLEINHENN
BY
Curtis, Morris & Safford
ATTORNEYS.

Feb. 10, 1970  W. H. KLEINHENN  3,494,243
SEALING FASTENER
Filed June 28, 1967  2 Sheets-Sheet 2
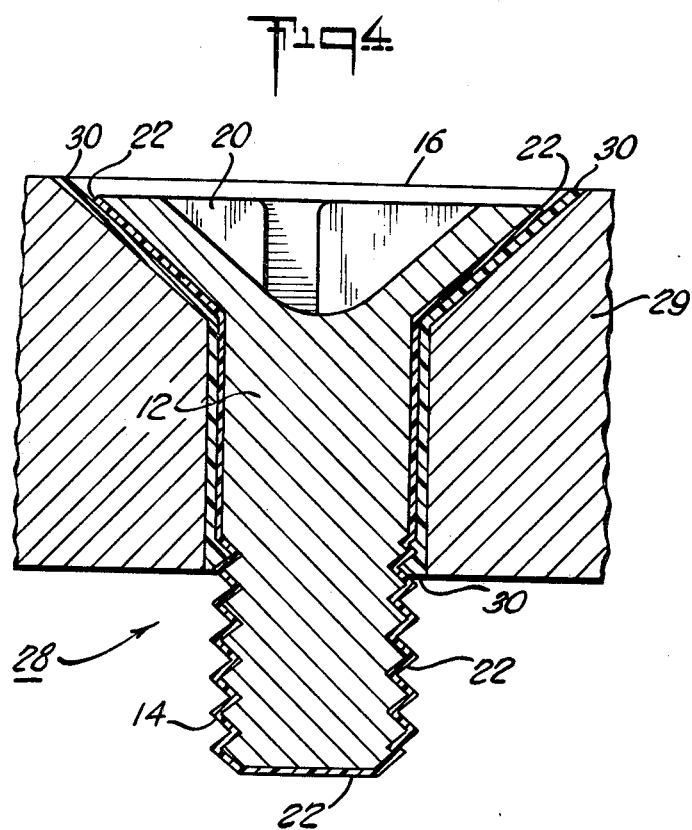
INVENTOR:
WALTER H. KLEINHENN
BY
Curtis, Morris & Safford.
ATTORNEYS.

United States Patent Office 3,494,243
Patented Feb. 10, 1970

3,494,243
SEALING FASTENER
Walter H. Kleinhenn, Flourtown, Pa., assignor to Standard Pressed Steel Co., Jenkintown, Pa., a corporation of Pennsylvania
Filed June 28, 1967, Ser. No. 649,591
Int. Cl. F16b *35/00;* B44d *1/42*
U.S. Cl. 85—1                                    11 Claims

ABSTRACT OF THE DISCLOSURE

A sealing fastener with a relatively thin adherent coating of a solid fluorocarbon polymer such as polytetrafluoroethylene resin ("Teflon") on the sealing surfaces of the fastener. One embodiment of the invention comprises a self-sealing screw with such a coating on the undersurface of the screw head to form a liquid-tight seal when in contact with the object to which the screw is fastened. The coating is of uniform thickness and perferably is built-up by dipping or spraying. The screw can be re-used many times without impairment of its sealing properties, and the seal is not impaired by hot corrosive substances such as jet aircraft fuel at temperatures up to 450° F. Another embodiment comprises a self-sealing screw with a similar coating covering not only the undersurface of the screw head, but also the screw shank and threads.

---

The present invention relates to sealing fasteners; that is, to devices which form fluid-tight seals when fastened to other objects. More particularly, the present invention relates to a re-usable threaded self-sealing fasteners for use in corrosion-producing surroundings, and at elevated temperatures and pressures.

Many problems have been encountered in the manufacture of sealing fasteners, particularly in the manufacture of self-sealing screws. Some self-sealing screws use separate plastic or rubber sealing washers to provide the seal. These screws are clumsy and inefficient to use, as well as having other deficiencies. Other self-sealing screws are made in one-piece units and have plastic or rubber O rings secured integrally to the screw. Still other screws do not have integral sealing means, but instead use a thick fluid sealing compound to provide a seal. It has been found, however, that such prior screws generally are not satisfactorily re-usable; that is, after the screw has been tightened and loosened, the seal may no longer be effective and leakage may occur if the screw is used again. Furthermore, many sealing materials lose their sealing properties when subjected to elevated temperatures or pressures, or to corrosive fluids. Thus, in jet aircraft, for example, where self-sealing screws are subjected to deterioration due to contact with jet aircraft fuel at temperatures up to 450° F., many sealing materials rapidly deteriorate and lose their sealing or re-sealing capabilities.

It is a major object of the present invention to solve the foregoing problems and thus provide a truly re-usable, integral, easy-to-use, self-sealing fastener which is relatively inexpensive to manufacture and which resists the destructive attacks of elevated temperatures and corrosion.

The foregoing objects of the present invention are met by the provision of a sealing fastener such as a screw with a relatively thin adherent coating of a fluorocarbon polymer such as a polytetrafluoroethylene resin (e.g., Du Pont "Teflon") on the sealing surface or surfaces of the screw. The coating is of uniform thickness and preferably is built-up by dipping or spraying to form one or more layers.

The description and drawings that follow describe the invention and indicate some of the ways in which it can be used. In addition, some of the advantages provided by the invention will be pointed out.

In the drawings:
FIGURE 1 is a plan view of a screw constructed in accordance with the present invention;
FIGURE 2 is an enlarged, partially cross-sectional view taken along line 2—2 of FIGURE 1;
FIGURE 3 is a partially cross-sectional view of a portion of the screw shown in FIGURES 1 and 2 and an object to which the screw is fastened; and
FIGURE 4 is a cross-sectional view of another screw constructed in accordance with the present invention.

The self-sealing screw 10 shown in the drawings has a shank portion 12 with threads 14 along a portion of shank, and an enlarged head 16 with a frustro-conically-shaped undersurface 18. As is shown in FIGURE 1, the head 16 has an offset, generally cross-shaped cavity 20 in its upper surface for receiving an offset type of screwdriver sold, for example, under the trademark "Torq-Set" by Phillips International Corporation.

In accordance with the present invention, the undersurface 18 of the screw head 16 has a relatively thin coating 22 of a solid fluorocarbon polymer resin such as a polytetrafluoroethylene resin. It is preferred to use tetrafluoroethylene (abbreviated "TFE") resin sold under the trademark "Teflon" by Du Pont. However, there are other recognized fluorocarbon compounds which have properties similar to TFE, such as polychlorotrifluoroethylene and trifluorochloroethylene, to name only two.

The TFE coating 22 is applied by first cleaning the surface 18 by means of a suitable mechanical or chemical cleaning process. For example, sand-blasting can be used to clean the surface, or the surface can be "phosphatized," the latter being a well known chemical cleaning process which cleans the surface and leaves it in excellent condition for bonding. Next, liquid "Teflon" is applied to the surface 18 by dipping or spraying the material in liquid form onto the surface 18 at or near room temperature. The surfaces upon which a coating is not desired are covered or otherwise protected so as not to receive a coating during this step of the process. This dipping or spraying step leaves a thin coating of from .0002 to .0008 inch in thickness on the surface 18. Then, the coating is sintered to harden it into a solid TFE coating which adheres tightly to the metal undersurface 18 of the screw. The details of this sintering process are well known and will not be described herein.

Next, the sintered coating is etched by means of a well-known chemical etching process so as to roughen the surface for receiving a further coat of TFE material. Then, successive coats of the material are added in accordance with the above-described procedures until a coating whose total thickness is approximately .002 inch is attained.

It is believed that the TFE coating also could be applied by casting, but at the present it is preferred to use dipping or spraying to provide a "built-up" coating. The term "built-up coating," as it is used in this description, is intended to mean a coating comprising one or more layers formed by depositing the coating material in fluid form onto the surface and then further treating the material to solidify it.

It is believed that the thickness of the coating should be at least .0002 to .0008 inch or more to provide proper sealing, and can be as great as .005 inch without impairing its sealing properties or its re-usability. Fluorocarbon compounds, and especially TFE, are highly resistant to attack from all but the most corrosive substances, and are particularly valuable because they are immune from deterioration due to contact with hydrocarbons such as jet aircraft fuel. Such substances provide impervious seals at continuous or intermittently-occurring temperatures up to or exceeding 450° F.

Although fluorocarbon resins have been suggested for use as loose gaskets for sealing applications involving low compressive force (see: M. A. Rudner, "Fluorocarbons," Reinhold, New York, 1958), it has been thought that such compounds were too much subject to permanent deformation to be usable for sealing under any substantial compressive stress. This is evident from prior art such as U.S. Patent 2,326,455 to Gray which shows fasteners superficially similar in construction to the fasteners disclosed herein, but which do not use the materials or seal structures of the present invention. It is believed that such seals are not truly re-usable and cannot withstand elevated temperatures and corrosive atmospheres. In short, they do not solve the problems solved by the present invention.

Contrary to the teachings of the prior art, it has been found that TFE, used as a coated seal as described above, does not permanently deform, even under great compressive stresses caused by the application of great tightening forces on the screw. That is, when the screw 10 is tightened against the surface to which it is fastened and then is removed from that surface for re-use, the coating 22 will spring back substantially to its original shape and will seal again the next time it is used, almost as if it were new. What is more, the TFE fluorocarbon material adheres very tightly to the metal surface 18. Because of this fact, and because of the further fact that fluorocarbon compounds, particularly TFE, have very low coefficients of friction, the coating 22 will not easily tear loose from the screw head, even when a very great amount of seating torque is applied to the screw. Still further, the seal provided by the present invention remains impervious at elevated temperatures, and despite frequent drastic changes in temperature such as are experienced in jet aircraft.

FIGURE 3 illustrates the clearances which might occur between the screw head 16 and the counter-sunk hole surface 24 in an object 26 to which the screw 10 is fastened. The nominal angle of the sides of the counter-sunk hole and of the screw head 16 is 100° plus or minus 1°. That is, both of the angles $\alpha$ and $\beta$ in FIGURE 3 nominally are 100°. Because of the 1° tolerance in each dimension, however, there can be as much as 2° difference in the two angles, with the result that the coating 22 (not shown in FIGURE 3) is compressed unevenly by contact between the hole sides 24 and the head of the screw head 16. That is, for the angles shown in FIGURE 3, the lower portion of the coating nearest the shank 12 will be greatly compressed, whereas the portion of the coating farthest from the shank will be compressed only a little or not at all. The thickness of the coating 22 is set at .002 inch in the specific embodiment of the invention shown in the drawings because, with the maximum angular difference between the sides of the screw head 16 and the hole into which it fits, the point at which there is a space .002 inch wide between the screw head and hole wall is somewhat less than halfway up on the screw head, and is below the line along which the "bearing area" of the screw is computed. Despite the uneven compression caused by wide tolerance variation in the screw head and the hole receiving it, and regardless of the clearances provided between the shank 12 and the hole through which the shank 12 fits, the sealing coating 22 seals tightly and yet does not deform permanently. When it is removed from the hole, it springs back to substantially its original shape and can be re-used without loss of its sealing properties.

FIGURE 4 illustrates another sealing screw 28 constructed in accordance with the present invention. The screw 28 is identical to the screw 10 shown in FIGURES 1 and 2 except that the coating 22 covers not only the undersurface of the screw head, but also covers the entire shank portion 12, including the unthreaded portion as well as the threaded portion 14.

The screw 28 is shown fitted into a counter-sunk hole in a member 29 to which the screw is to be attached. The clearances between the member 29 and the screw 28 are such that a thick fluid sealing compound 30 is used to form a truly liquid-tight seal between the screw and the member. There are many different types of compounds available for use as the sealing compound 30. For example, a typical compound is a temperature-resistant, accelerated polysulfide rubber compound. Other suitable compounds are those commonly used to meet U.S. Military Specification MIL–S–8802C. Such compounds have been used in the past with ordinary screws. In such prior arrangements, the sealing compound often adheres to the screw when it is withdrawn from the hole. As a result, the layer of sealing compound is torn and often will not seal again if the same or another screw is fitted into the hole. However, it has been discovered that the sealing compound does not adhere to the fluorocarbon coating 22 on the screw 28, with the result that the screw 28 may be re-used many times without need for applying additional sealing compound to the joint between the screw 28 and the member 29.

The use of the coating 22 on the shank 12 as well as the head of the screw 28 has an additional advantage if the metal of the screw is different from the metal of the member 29. In such circumstances the coating 22 provides protection against corrosion which might occur due to contact between the dissimilar metals of the screw and the member 29 to which it is attached. This advantage is obtained regardless of whether the sealing compound 30 is used.

It should be apparent from the foregoing that the coating 22 need not cover the entire surface of the screw in order to obtain the advantages described above. A coating which covers only the surfaces to be contacted by the sealing compound will give the anti-adhesion results described above, and a coating which covers only the screw portion which normally would contact the dissimilar metal of the member to which the screw is to be attached will give the anti-corrosion benefits described above.

The use of the coatings described herein is not limited to the particular fasteners described above. For example, the coating can be used on a flat annularly-shaped undersurface of a fastener head, or on other shapes of fastener surfaces which are to mate with an object to which the fastener is attached.

The above description of the invention is intended to be illustrative and not limiting. Various changes or modifications in the embodiments described may occur to those skilled in the art and these can be made without departing from the spirit or scope of the invention.

I claim:

1. An assembly including a workpiece with a hole in it and a fastener in the hole, a sealing surface on said workpiece adjacent said hole, a layer of a relatively thick fluid sealing compound encompassing said hole on said sealing surface, and a relatively thin sealing coating of a fluorocarbon polymer resin adhered to the portion of said fastener opposing said fluid sealing compound.

2. Apparatus as in claim 1 in which said fastener has a head and a shank, said fluorocarbon coating covering the underside of said head and at least a portion of said shank.

3. Apparatus as in claim 1 in which said fluorocarbon polymer resin comprises tetrafluorethylene.

4. Apparatus as in claim 1 in which said fastener has a head and a shank, said fluorocarbon coating covering the underside of said head and at least a portion of said shank, in which said fluorocarbon polymer resin comprises tetrafluorethylene, and in which said head and a portion of said sealing surface are frusto-conically shaped, said sealing surface of said work piece including a side-wall portion of said hole.

5. An assembly including a workpiece with a hole in it and a fastener in the hole, said workpiece and said fastener being made of different metals, and a coating of a fluorocarbon polymer resin of from approximately .0004 to .005 inch in thickness adhered to the portion of said fastener opposing said workpiece.

6. Apparatus as in claim 5 in which said fluorocarbon polymer resin comprises tetrafluorethylene.

7. Apparatus as in claim 6 in which said fluorocarbon coating is a multi-layered, built-up coating.

8. Apparatus as in claim 5 in which said fluorocarbon polymer resin comprises tetrafluorethylene, in which said fluorocarbon coating is a multi-layered, built-up coating of from approximately .0004 to .005 inch in thickness, and in which said fastener has a head and a shank, said fluorocarbon coating covering at least the underside of said head of said fastener.

9. A self-sealing fastener for providing a liquid-tight seal between said fastener and an object to which said fastener is to be fastened, said seal being impervious to impairment due to contact with hydrocarbon liquids at relatively high temperatures, said fastener having an elongated shank with an enlarged head at one end of said shank, said head having an undersurface to contact said object, means for engaging a rotary driving tool to drive said fastener with said undersurface of said head sliding against said object when being driven into contact with said object, and a relatively thin built-up multilayered sintered adherent sealing coating of solid polytetrafluorethylene of from .0004 to .005 inch in thickness on said undersurface.

10. Apparatus as in claim 9 in which said head of said fastener has a frustoconically-shaped undersurface with said coating on it, and including a workpiece with a hole in it, said hole having a frusto-conically-shaped portion contacting said coating of said fastener.

11. Apparatus as in claim 9 in which said coating is approximately .002 inch thick.

References Cited

UNITED STATES PATENTS

| | | | |
|---|---|---|---|
| 2,326,455 | 8/1943 | Gray | 85—37 |
| 2,847,894 | 8/1958 | Smith et al. | 85—45 |
| 3,002,770 | 10/1961 | Chesnut et al. | |
| 3,060,112 | 10/1962 | Shomber | 85—1 X |
| 3,103,446 | 9/1963 | Fitz Simmons | 117—75 |

FOREIGN PATENTS

| | | |
|---|---|---|
| 1,009,184 | 10/1954 | France. |
| 1,069,237 | 2/1954 | France. |

OTHER REFERENCES

Fasteners, Vol. 9, No. 2, Industrial Fasteners Institute, 1953, pp. 7–10, "Titanium Fastener Development Report."

RAMON S. BRITTS, Primary Examiner

U.S. Cl. X.R.

117—128.4